Nov. 11, 1969  C. W. GARDNER ETAL  3,477,601
MATERIAL HANDLING FORK
Filed Dec. 14, 1967  2 Sheets-Sheet 1
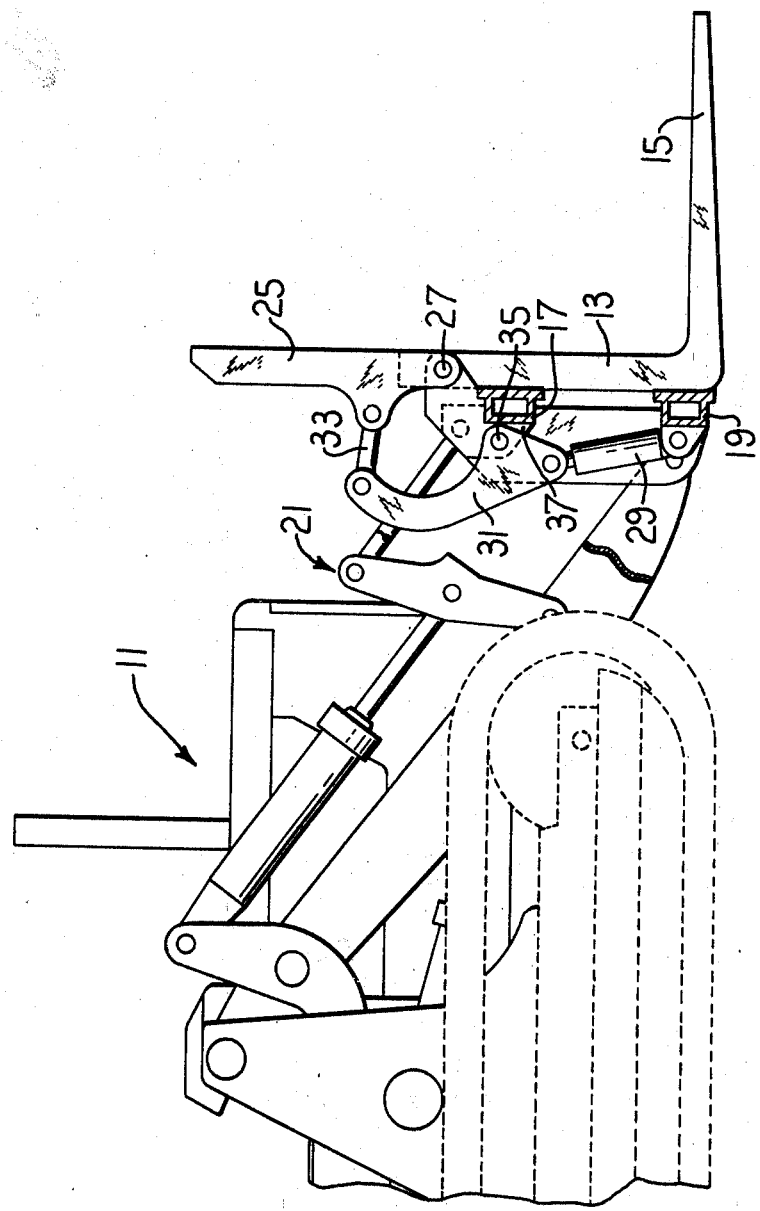
INVENTORS
CHARLES W. GARDNER
GAIL G. BARBEE
BY
Fryer, Tjensvold, Feix, Phillips & Lempio
ATTORNEYS

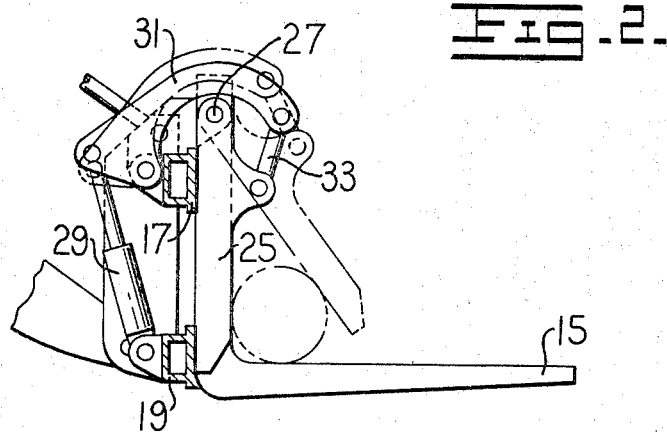
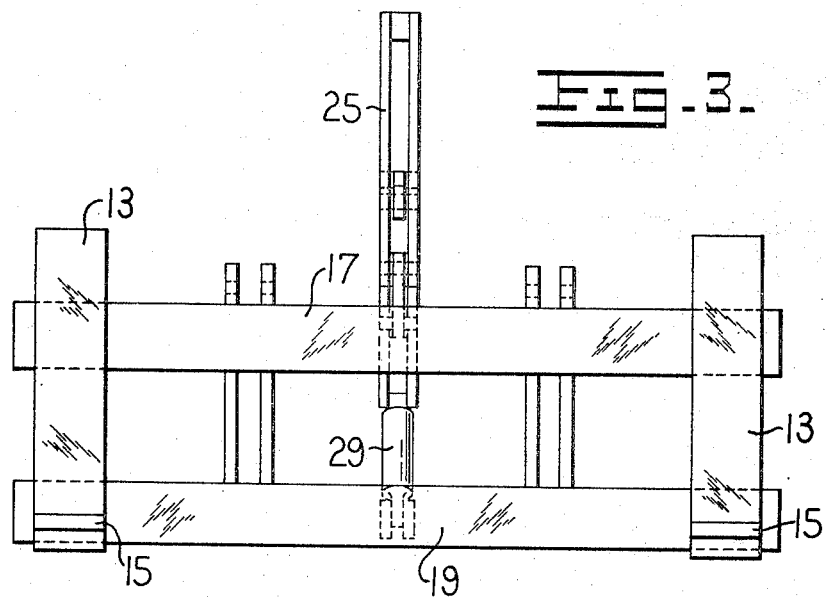

3,477,601
MATERIAL HANDLING FORK

Charles W. Gardner and Gail G. Barbee, Aurora, Ill., assignors to Caterpillar Tractor Co., Peoria, Ill., a corporation of California
Filed Dec. 14, 1967, Ser. No. 690,646
Int. Cl. B66c *3/00;* E02f *3/00;* B66f *9/18*
U.S. Cl. 214—767                    2 Claims

ABSTRACT OF THE DISCLOSURE

A material handling fork having a clamping arm which is hydraulically controlled and can be rotated approximately 180° so that it can clamp materials to the fork tines or can be used as a material "kicker."

---

When using a material handling fork upon a wide variety of articles, presently available material handling machines have proven to be unsatisfactory since they are designed to handle one particular type of material and will not effectively handle other types. It is obvious, for example, that most handling devices are unsatisfactory when called upon to handle lumber, pipe, palletized material, and crates in sequence since the handling portion of the devices are not designed to handle more than one or two of these items.

It is therefore an object of the present invention to provide a material handling device which may be utilized in handling a wide variety of sizes and shapes of articles without requiring a variety of material handling structures.

It is also an object of the present invention to provide a material handling device in which the articles to be handled may be clamped to the machine.

It is a further object of the present invention to provide a material handling device wherein, when desired, a portion of the device may be utilized as a material "kicker" or pusher to push some types of material away from the machine after handling.

It is also an object of the present invention to provide a material handling fork having a clamping arm for clamping materials to the fork.

Further objects and advantages will appear from the following description and appended claims when viewed in conjunction with the attached drawings wherein FIG. 1 is a side sectional view of a typical vehicle having the present invention mounted thereon;

FIG. 2 is a view similar to that of FIG. 1 showing the structure actuated to an operative position; and FIG. 3 is a front view of the invention showing the relationships of the various material handling means.

Referring now to the drawings in greater detail, there is shown in FIG. 1 a vehicle 11 which, as illustrated, may be a tracked vehicle or may be of any other suitable traction means. Suitably attached to the vehicle in a conventional manner are a pair of fork tines having upstanding portions 13 and substantially horizontal portions 15. The tines are supported by suitable means such as braces 17 and 19 and may be elevated or depressed by a conventional structure as shown at 21.

A clamp arm 25 is suitably connected to the fork as a pivot 27 on a bracket 37 mounted between the upstanding portions 13. Movement of the clamp arm is controlled by a hydraulic jack 29 acting through a lever 31 and a link 33. The lever 31 is pivotally supported at a pivot point 35 on the bracket 37 which is fastened to the support member 17.

Link 33 is suitably fastened to lever 31 and bar 25 at pivot points therein and hydraulic jack 29 is pivotally fastened to lever 31 in a lower support member 19. Upon actuation of the hydraulic jack, the clamp bar is freely movable by the jack between predetermined limits in a 180° arc, being coplanar with the tine upright 13 at each of the limits. As shown in FIG. 2, when the jack is actuated the bar may clamp a workpiece between itself and the tines of the fork, as shown in phantom, or it may be extended to a downward vertical position as shown in the figure for use as a pusher or "kicker" in removing material from the tines.

The drawings illustrate the use of a single clamp bar to be utilized with the material handling fork; it is obvious that if desired a plurality of such clamping bars may be used in a single device.

Thus a new and useful material handling means has been provided which will allow the handling of a multiplicity of sizes and shapes without requiring modification of the material handling means between tasks.

We claim:
1. In a material handling apparatus,
    a vehicle,
    a pair of fork tines mounted on the vehicle,
    each fork tine having an upstanding portion and a horizontal portion,
    support means fastened between the upstanding portions of the fork tines,
    a bracket fixedly mounted on the support means,
    a straight arm member pivotally mounted on the bracket, and
    means mounted on the support means for pivoting the straight arm through a 180° arc from a first position wherein it is coplanar with the upstanding portions of the fork tines to a second position wherein it is also coplanar with the upstanding portions of the fork tines.
2. The apparatus of claim 1 including:
    an articulated linkage pivotally fastened to the bracket and the straight arm member, and wherein
    the pivoting means comprises a hydraulic jack means acting between the articulated linkage and the support means.

References Cited
UNITED STATES PATENTS

| | | | |
|---|---|---|---|
| 2,958,434 | 11/1960 | Wagner | 214—510 |
| 3,165,345 | 1/1965 | Gardner | 214—654 X |
| 3,338,442 | 8/1967 | Armeneau et al. | 214—767 |
| 3,352,442 | 11/1967 | Maghuson | 214—767 |

HUGO O. SCHULZ, Primary Examiner

U.S. Cl. X.R.
214—147, 654